(12) United States Patent
Formanski et al.

(10) Patent No.: US 7,276,308 B2
(45) Date of Patent: Oct. 2, 2007

(54) FUEL CELL SYSTEM WITH RECUPERATIVE HEAT EXCHANGER

(75) Inventors: Volker Formanski, Wiesbaden (DE); Thomas Herbig, Darmstadt (DE); George R. Woody, Wiesbaden (DE); John P. Salvador, Penfield, NY (US); Steven D. Burch, Honeoye Falls, NY (US); Uwe Hannesen, Brechen (DE)

(73) Assignee: General Motors Corporation, Detroit, MI (US)

( * ) Notice: Subject to any disclaimer, the term of this patent is extended or adjusted under 35 U.S.C. 154(b) by 617 days.

(21) Appl. No.: 10/696,267

(22) Filed: Oct. 29, 2003

(65) Prior Publication Data

US 2004/0151959 A1 Aug. 5, 2004

Related U.S. Application Data

(63) Continuation-in-part of application No. 10/356,333, filed on Jan. 31, 2003, now abandoned.

(51) Int. Cl. *H01M 8/04* (2006.01)
(52) U.S. Cl. .......................... 429/26; 429/34
(58) Field of Classification Search ............... 429/26, 429/34
See application file for complete search history.

(56) References Cited

U.S. PATENT DOCUMENTS

| | | | |
|---|---|---|---|
| 4,473,622 A | 9/1984 | Chludzinski et al. | 429/26 |
| 5,968,680 A | 10/1999 | Wolfe et al. | 429/26 |
| 6,045,933 A | 4/2000 | Okamoto | 429/26 |
| 6,309,770 B1 | 10/2001 | Nagayasu et al. | 429/26 |
| 6,365,289 B1 | 4/2002 | Lee et al. | 429/26 |
| 6,428,916 B1 | 8/2002 | Grasso et al. | 429/26 |
| 6,896,988 B2 * | 5/2005 | Wang et al. | 429/26 |
| 7,026,065 B2 * | 4/2006 | Ballantine et al. | 429/26 |

* cited by examiner

*Primary Examiner*—Stephen J. Kalafut
(74) *Attorney, Agent, or Firm*—John A. Miller; Miller IP Group, PLC

(57) ABSTRACT

A fuel cell system that employs a recuperative heat exchanger to provide additional cooling for the compressed charge air applied to the cathodes of the fuel cells in the fuel cell stack. The cathode exhaust gas is applied to the recuperative heat exchanger so that the cathode exhaust gas cools the charge air heated by the compressed air. A cathode exhaust gas expander is provided in combination with the recuperative heat exchanger that uses the energy in the heated cathode exhaust gas to power the charge air compressor. An anode exhaust gas combustor can be provided that burns residual hydrogen in the anode exhaust gas to further heat the cathode exhaust gas before it is applied to the expander.

23 Claims, 6 Drawing Sheets

FUEL CELL SYSTEM WITH RECUPERATIVE HEAT EXCHANGER

CROSS-REFERENCE TO RELATED APPLICATIONS

This application is a continuation-in-part application of U.S. patent application Ser. No. 10/356,333, titled Fuel Cell System With Recuperative Heat Exchanger, filed Jan. 31, 2003, now abandoned.

BACKGROUND OF THE INVENTION

1. Field of the Invention

This invention relates generally to a fuel cell system and, more particularly, to a fuel cell system employing a recuperative heat exchanger for providing additional cooling of the charge air and the fuel cell stack in the system.

2. Discussion of the Related Art

Hydrogen is a very attractive source of fuel because it is clean and can be used to efficiently produce electricity in a fuel cell. The automotive industry expends significant resources in the development of hydrogen fuel cells as a source of power for vehicles. Such vehicles would be more efficient and generate fewer emissions than today's vehicles employing internal combustion engines.

A hydrogen fuel cell is an electro-chemical device that includes an anode and a cathode with an electrolyte therebetween. The anode receives a hydrogen gas and the cathode receives oxygen. The hydrogen gas is ionized in the anode to generate free hydrogen protons and electrons. The hydrogen protons pass through the electrolyte to the cathode. The hydrogen ions react with the oxygen and the electrons in the cathode to generate water as a by-product. The electrons from the anode cannot pass through the electrolyte, and thus are directed through a load to perform electrical work, before being sent to the cathode. The work acts to operate the vehicle. Many fuels cells are combined in a stack to generate the desired power.

Proton exchange membrane (PEM) fuel cells are a popular fuel cell for vehicles because they provide high power densities by high system efficiencies. In a PEM fuel cell, hydrogen ($H_2$) is the anode reactant, i.e., fuel, and oxygen is the cathode reactant, i.e., oxidant. The cathode reactant can be either pure oxygen ($O_2$) or air (a mixture of mainly $O_2$ and $N_2$). The electrolytes are solid polymer electrolytes typically made from ion exchange resins such as perfluoronated sulfonic acid. The anode and cathode are typically comprised of finely divided catalytic particles, which are often supported on carbon particles and mixed with a proton conductive resin.

FIG. 1 is a general schematic plan view of a known PEM fuel cell system 10 of the type discussed above. The fuel cell system 10 includes a conventional fuel cell stack 12 having a plurality of fuel cells 14 electrically coupled in series. Each of the fuel cells 14 includes a cathode and an anode. The fuel cells 14 receive an anode hydrogen gas from a suitable source on a line 18 and a cathode charge gas (compressed air) on a line 20 to provide the chemical reaction that generates output power 22 to drive the vehicle. A series of cooling channels 24, represented in the drawings as a heat exchanger, running through the stack 12 removes heat therefrom generated by the chemical reactions in the fuel cells 14.

Anode exhaust gas is, for example, exhausted from the stack 12 on line 28 through a back pressure valve (BPV) 26. Pressurized cathode exhaust gas is exhausted from the stack 12 on line 30 at the temperature of the fuel cell stack 12, and makes up the major portion of the system exhaust. Water is a by-product of the cathode exhaust, but it would be problematic to release liquid water into the environment. Therefore, the cathode exhaust gas is applied to a liquid separator 32 that separates liquid water therefrom, and provides the separated exhaust gas on line 34 and liquid water on line 38. The separated cathode exhaust gas is output to atmosphere through a BPV 36. The liquid water on the line 38 can be provided to other system elements that may use water for cooling and the like.

Ambient charge air on line 42 is applied to a compressor 44 to compress the volume of the air to provide the cathode gas at the fuel cell operating pressure. The compressor 44 is powered by an electrical motor 46 through an output shaft 48. The compressor 44 heats the charge air as it is compressed. The compressed and heated air is sent through a suitable charge air cooler (CAC) or heat exchanger 52 on line 50, where it is cooled. The waste heat of the compressor 44 is the thermal load of the heat exchanger 52. The cooled charge air on the line 50 is then sent to a humidification device 54 where it is mixed with water vapor. Water vapor needs to be mixed with the charge air so that there is moisture for the electrolyte between the anode and cathode in the fuel cells 14 to provide the necessary conductivity. The compressed and humidified charge air is then applied to the stack 12 on the line 20.

A coolant loop 58 provides a cooling fluid, such as a water/glycol mixture, to the cooling channels 24 and the heat exchanger 52. The cooling fluid is forced through the loop 58 by a coolant pump 56. The heated cooling fluid is delivered by the loop 58 to a radiator fan module (RFM) 62 to remove the heat therefrom. In one embodiment, the temperature of the charge air on the line 50 at the output of the compressor 40 is in the range of ambient to 200° C., and the temperature of the charge air on the line 20 provided to the stack 12 is in the range of 60°-80° C. A fan 64 forces air through the RFM 62 to cool the heated fluid from the cooling channels 24 and the heat exchanger 52. The cooling fluid is then sent back through the coolant loop 58, first to the heat exchanger 52 to cool the compressed charge air on the line 50 and then to the stack 12, where it flows through the cooling channels 24.

In current fuel cell system designs, the RFM 62 is the typical radiator employed in conventional vehicles having an internal combustion engines. However, the operating temperature of an internal combustion engine is greater than the operating temperature of the fuel cell system 10, and thus fuel cell systems need to be cooled to a lower temperature level than internal combustion engines. Therefore, current RFMs used for internal combustion engines would not provide sufficient heat exchange area and air mass flowing therethrough to provide enough cooling for the system 10. The total system off heat (including the heat from the heat exchanger 52) is a critical limiting factor in the design of the system 10 and has significant impact on the system layout and design. It would be desirable to provide an additional technique for removing heat from the system 10 so that the known RFMs can be employed within the vehicle.

SUMMARY OF THE INVENTION

In accordance with the teachings of the present invention, a fuel cell system is disclosed that employs a recuperative heat exchanger to provide additional cooling for the compressed charge air applied to the cathodes of the fuel cells in the fuel cell stack. Cathode exhaust gas and the compressor charge air are applied to the recuperative heat exchanger, so that the cathode exhaust gas cools the compressed charge air and reduces the rejected heat from the compressed air to the thermal system. In another embodiment, a cathode exhaust gas expander is provided in combination with the recuperative heat exchanger that uses the energy in the heated exhaust gas to power the charge air compressor. An anode exhaust gas combustor can be provided that burns residual hydrogen in the anode exhaust gas to further heat the cathode exhaust gas before it is applied to the expander. In another embodiment, a heat exchanger is provided to cool the cathode exhaust gas.

Additional advantages and features of the present invention will become apparent from the following description and appended claims, taken in conjunction with the accompanying drawings.

DETAILED DESCRIPTION OF THE EMBODIMENTS

The following discussion of the embodiments of the invention directed to a fuel cell system is merely exemplary in nature, and is in no way intended to limit the invention or its application or uses.

Figure 1:
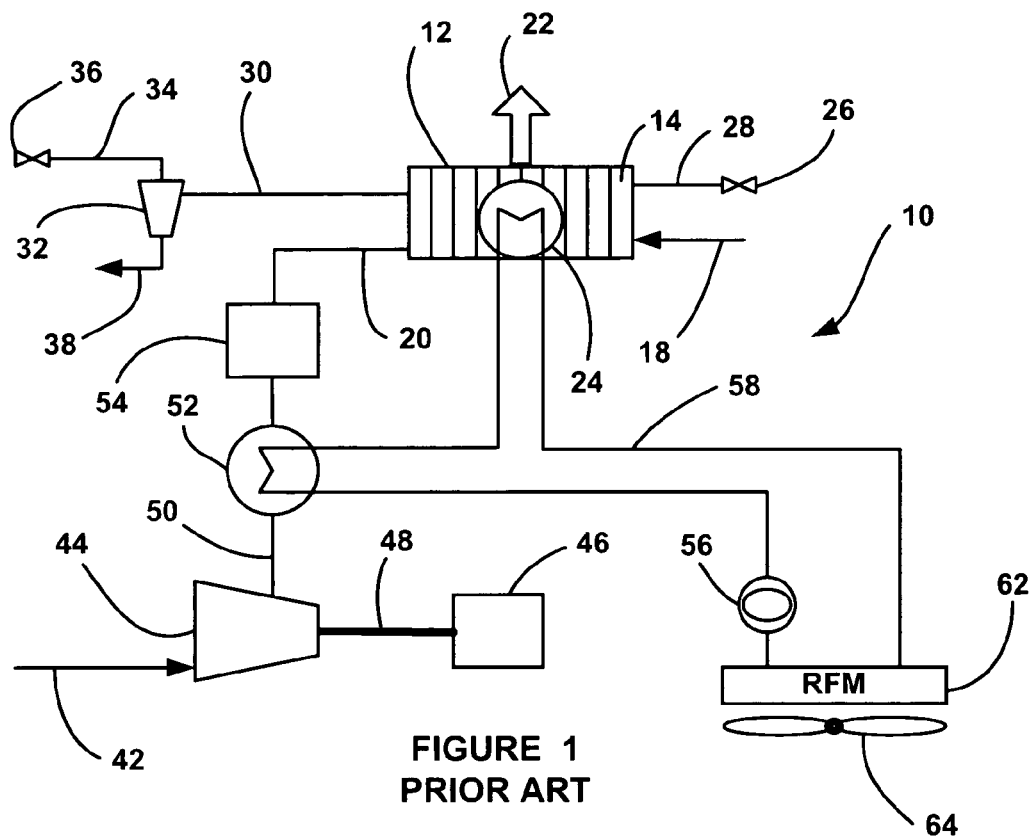
FIG. 1 is a general schematic diagram of a known fuel cell system.
Figure 2:
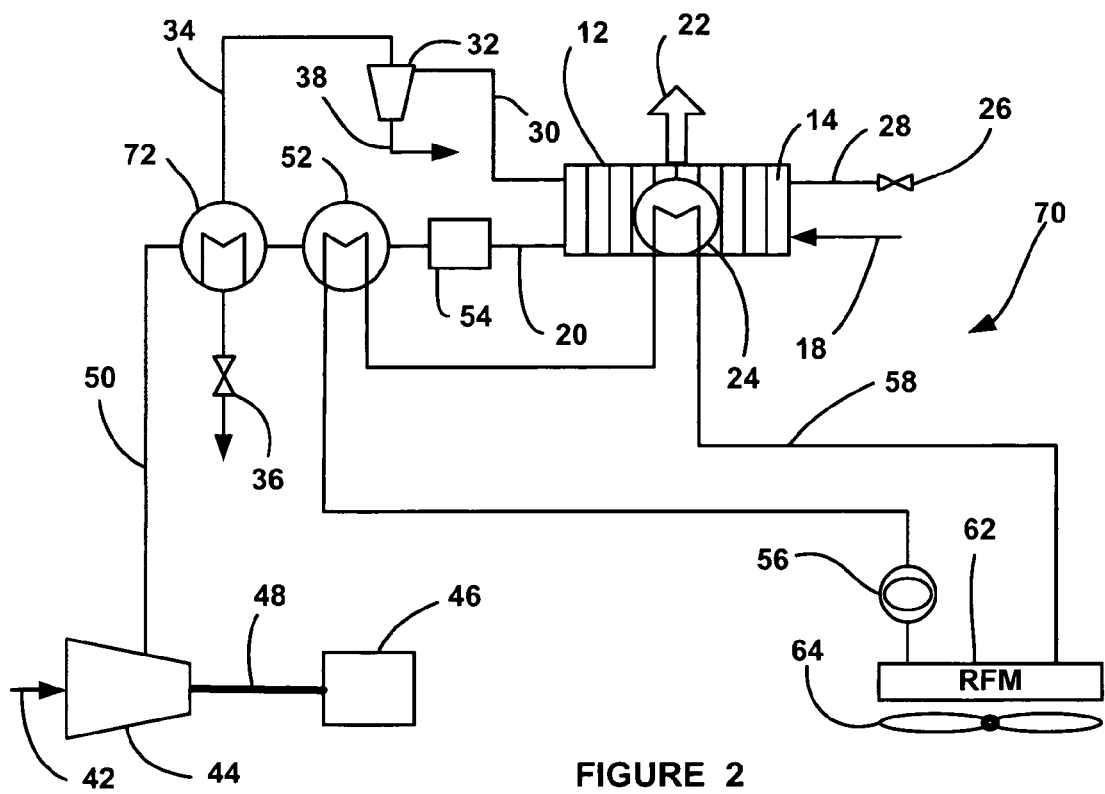
FIG. 2 is a schematic diagram of a fuel cell system employing a recuperative heat exchanger, according to an embodiment of the present invention.

FIG. 2 is a schematic diagram of a fuel cell system 70 similar to the system 10 above where like elements are represented by the same reference numeral. According to the invention, the system 70 includes a gas/gas recuperative heat exchanger 72 positioned between the compressor 44 and the heat exchanger 52 in the line 50. The heat exchanger 72 provides additional cooling to the compressed air in the line 50 so that the heat exchanger 52 can provide less cooling, and thus the RFM 62 can be made smaller and still satisfy system thermal load requirements. The cathode exhaust gas on the line 34 flows through the heat exchanger 72 and operates to cool the charge air, so that the heat removed from the compressed charge air by the heat exchanger 72 is taken away by the cathode exhaust gas flow. In one embodiment, the heat exchanger 52 in the system 10 removes about 10% of the total system off heat. By employing the recuperative heat exchanger 72, the heat exchanger 52 only needs to remove about 1% of the total system off heat for the same size RFM 62.

In this embodiment, the heat exchanger 72 is positioned between the BPV 36 and the water separator 32. Therefore, the recuperative heat exchanger 72 reduces the thermal load on the heat exchanger 52 by using the cathode exhaust gas to provide system cooling. The cathode exhaust gas temperature is increased, which facilitates the desired gas composition for the proper delivery of product water.

As discussed above, the heat exchanger 72 is positioned between the compressor 44 and the heat exchanger 52. However, this is by way of a non-limiting example in that the heat exchanger 72 can be positioned at any suitable location in the line 50 between the stack 12 and the compressor 44.

Figure 3:
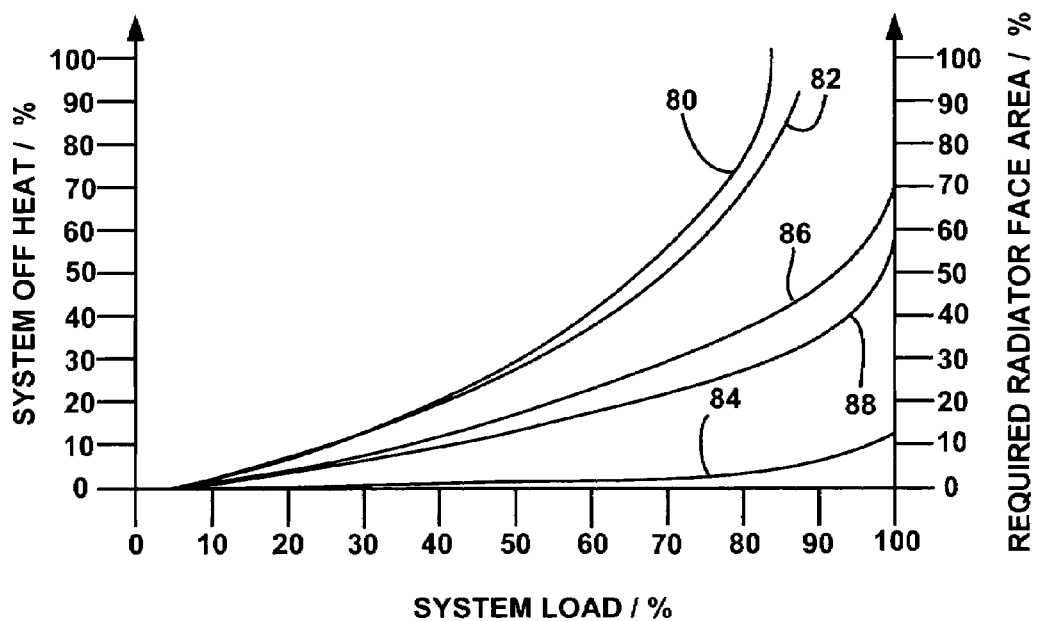
FIG. 3 is a graph with system off heat and required radiator face area on the vertical axis and system load on the horizontal axis showing the heat load of the fuel cell system of FIG. 2.

FIG. 3 is a graph with system off heat on the vertical axis and system load on the horizontal axis showing the waste heat for the systems 10 and 70. Particularly, graph line 80 shows the waste heat of the system 10 without the recuperative heat exchanger 72. Graph line 82 shows the waste heat of the system 70 with the recuperative heat exchanger 72. Graph line 84 shows the waste heat reduction provided by the system 70 with the recuperative heat exchanger 72.

FIG. 3 also includes the radiator face area of the RFM 62 on the vertical axis to show the required radiator surface area that provides the desired cooling with and without the recuperative heat exchanger 72. Particularly, graph line 86 shows the required radiator face area of the RFM 62 in the system 10 without the recuperative heat exchanger 72, and graph line 88 shows the required face area of the RFM 62 in the system 70 with the recuperative heat exchanger 72. For a total thermal load, assuming a standard automotive fan 64, the required radiator surface area for the system 10 is about 71% of the total vehicle front area and the required radiator surface area for the system 70 is about 59%. This is a radiator surface area reduction of about 17%.

Figure 4:
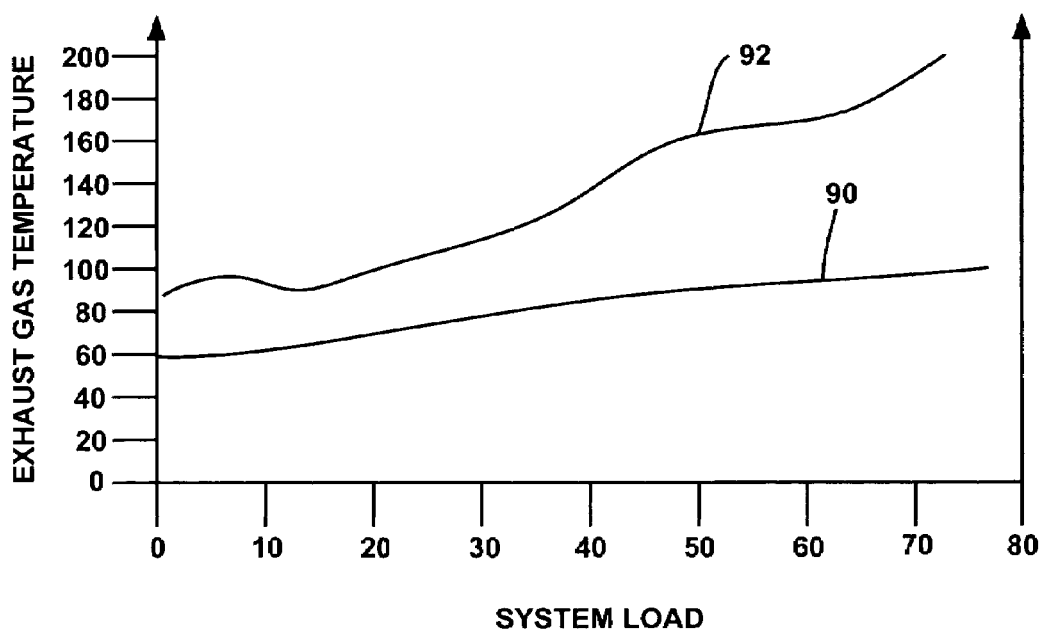
FIG. 4 is a graph with exhaust gas temperature on the vertical axis and system load on the horizontal axis for the fuel cell system shown in FIG. 2.

FIG. 4 is a graph with exhaust gas temperature on the vertical axis and system load on the horizontal axis showing the cathode exhaust gas temperature of the systems 10 and 70. Particularly, graph line 90 shows the exhaust gas temperature of the system 10 without the recuperative heat exchanger 72, and graph line 92 shows the exhaust gas temperature of the system 70 with the recuperative heat exchanger 72. For higher system loads, for example 70 kW, the temperature difference between the cathode exhaust gas of the systems 10 and 70 is 180° C.

Figure 5:
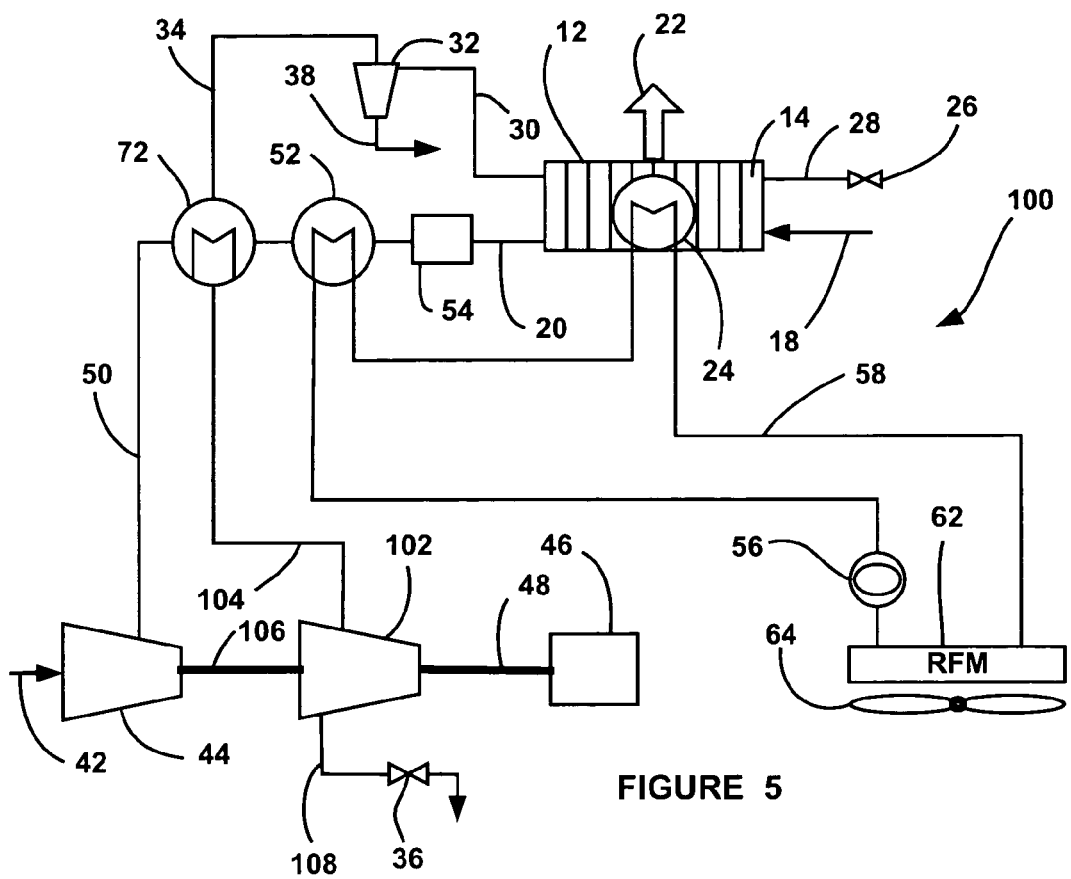
FIG. 5 is a schematic diagram of a fuel cell system employing a recuperative heat exchanger and a cathode gas expander, according to another embodiment of the present invention.

FIG. 5 is a schematic diagram of a fuel cell system 100 similar to the system 70 above where like elements are represented by the same reference numeral, according to another embodiment of the present invention. In this embodiment, the system 100 employs a cathode exhaust gas expander 102 that receives the pressurized and heated cathode exhaust gas from the heat exchanger 72 on line 104. The cathode exhaust gas is heated by the heat exchanger 72. The cathode exhaust gas expander 102 converts the heat to mechanical energy. The expander 102 uses the temperature of the cathode gas to rotate an element therein that rotates a shaft 106. The shaft 106 is coupled to the compressor 44 and provides at least part of the energy to operate it. Therefore, the gas expander 102 allows the power requirement of the compressor 44 to be reduced. Thus, the size of the motor 46 can be reduced so that the energy required to operate the system 100 can be reduced. The expanded cathode exhaust gas is then output to ambient on line 108 through the BPV 36.

Figure 6:
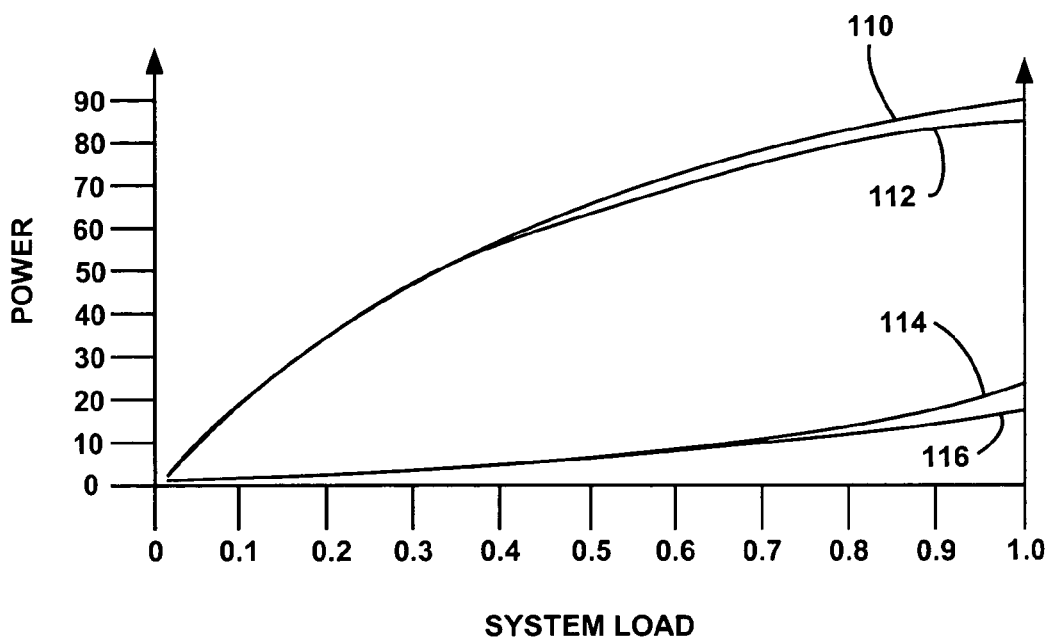
FIG. 6 is a graph with power on the vertical axis and system load on the horizontal axis showing a comparison of the system power demand of the fuel cell system of FIG. 5.

FIG. 6 is a graph with power on the vertical axis and system load on the horizontal axis showing a comparison of system power available demand from the system 100 with the cathode gas expander 102 and the system 70 without the gas expander 102. Particularly, graph line 110 shows the net power available from the system 70 with the recuperative heat exchanger 72 and the gas expander 102. Graph line 112 shows the net power demand of the system 10 without the recuperative heat exchanger 72. Graph line 114 shows the required electrical compressor power of the system 10 without the recuperative heat exchanger 72 and the gas expander 102. Graph line 116 shows the required electrical compressor power of the system 100 with the gas expander 102 and the recuperative heat exchanger 72.

Figure 7:
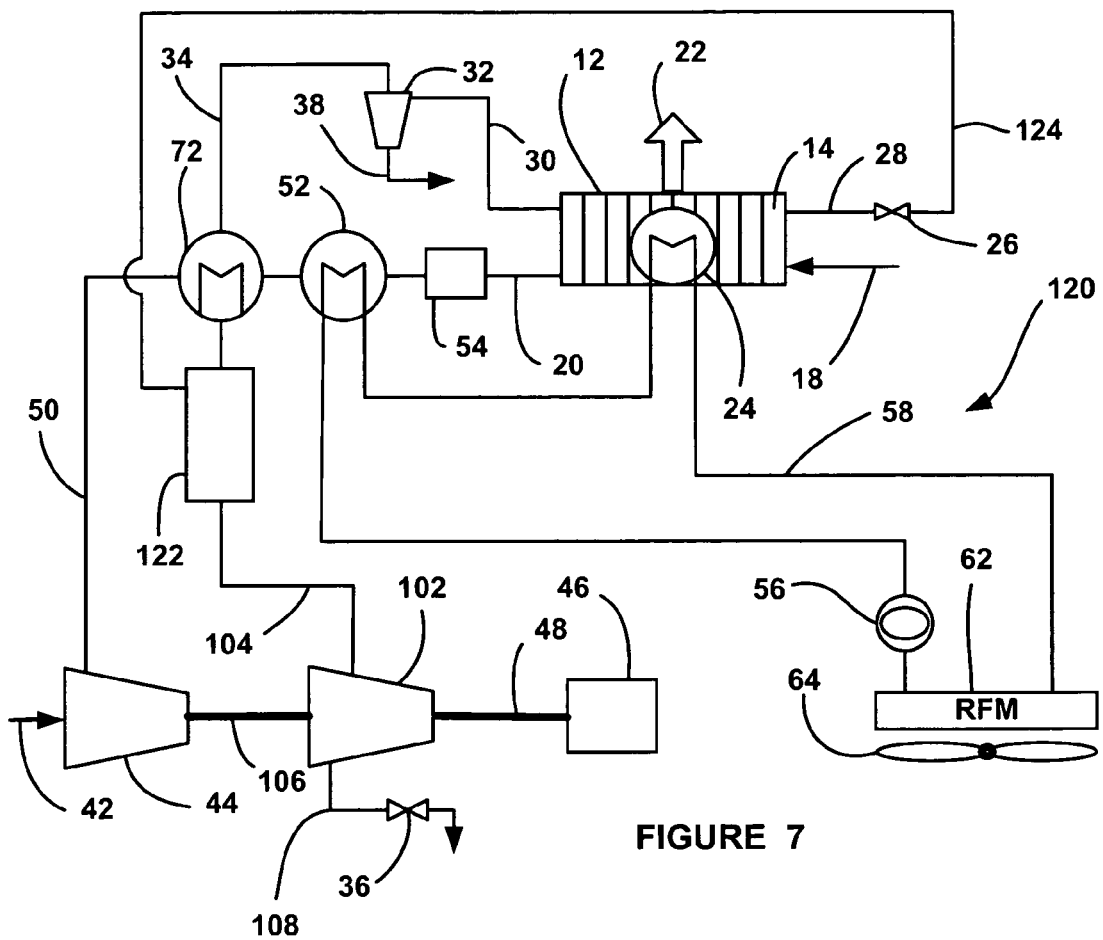
FIG. 7 is a schematic diagram of a fuel cell system employing a recuperative heat exchanger, a cathode gas expander and an anode exhaust burner, according to another embodiment of the present invention.

FIG. 7 is a schematic diagram of a fuel cell system 120 similar to the system 100 above where like elements are represented by the same reference numeral, according to another embodiment of the present invention. In this embodiment, an anode exhaust gas burner or combustor 122 is provided to burn residual hydrogen in the anode exhaust gas. Typically, a small amount of hydrogen is left in the anode exhaust gas on the line 28. The anode exhaust gas burner 122 receives the anode exhaust gas on line 124 and the heated cathode exhaust gas on the line 104. The anode exhaust gas burner 122 combusts the hydrogen to further heat the cathode exhaust gas before it is applied to the expander 102, and thus further reduce the required compressor power from the motor 46. The anode burner 122 can be any combustor suitable for the purposes described herein.

Figure 8:
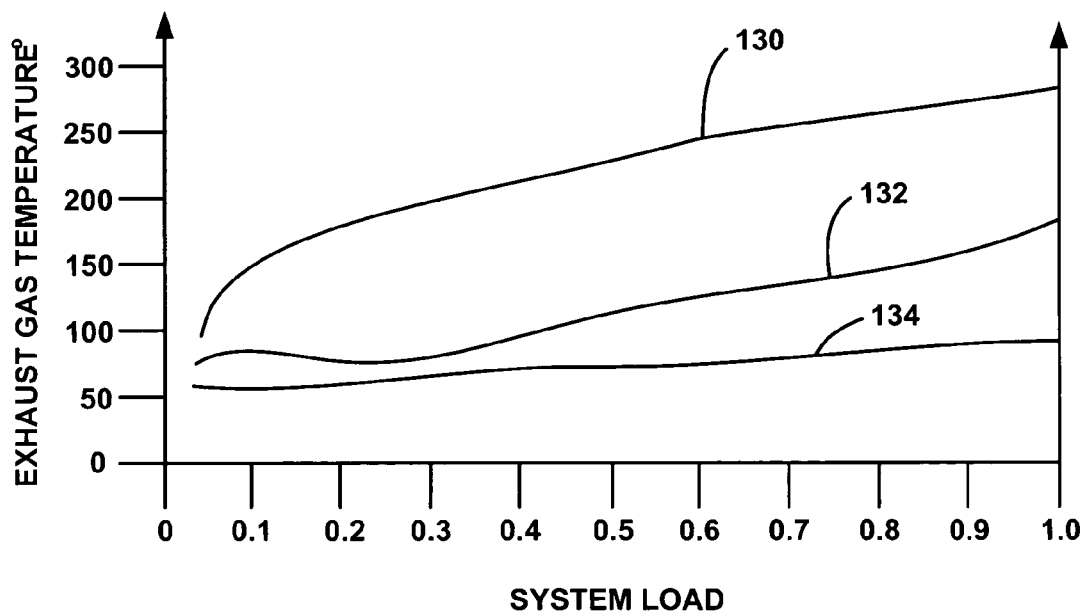
FIG. 8 is a graph with exhaust gas temperature on the vertical axis and system load on the horizontal axis showing a comparison of the exhaust gas temperature of the systems of FIGS. 5 and 7.

FIG. 8 is a graph with exhaust gas temperature on the vertical axis and system load on the horizontal axis showing a comparison of exhaust gas temperatures of the various systems disclosed herein with and without the anode exhaust burner 122. Particularly, graph line 130 shows the exhaust gas temperature of the system 120 with the recuperative heat exchanger 72 and the anode exhaust gas burner 122. Graph line 132 shows the exhaust gas temperature of the system 100 with the recuperative heat exchanger 72, but without the anode exhaust gas burner 122. Graph line 134 shows the exhaust gas temperature of the system 10 without the recuperative heat exchanger 72 and the anode exhaust gas burner 122.

For a total load case, the exhaust gas temperature of the system 10 would be the same as the stack operating temperature. For the system 70 with the recuperative heat exchanger 72, the cathode exhaust gas temperature, for example, rises to approximately 170° C. For the system 120, the anode burner 122 can provide an additional 6-7 kW of heat to the exhaust gas. For a mass flow of about 95 g/s, this is equivalent to a temperature increase of about 70 K. The temperature increase of the cathode gas expander inlet gas makes it possible to recover more energy from the cathode exhaust gas.

Figure 9:
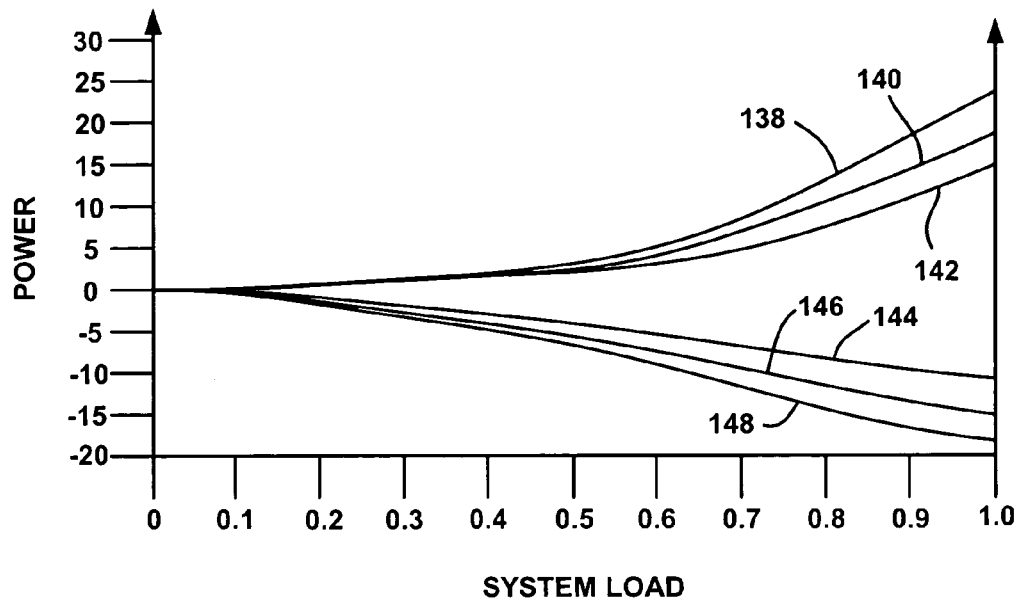
FIG. 9 is a graph with power on the vertical axis and system load on the horizontal axis showing a comparison of a proposed adiabatic expander output and the result required for electrical compressor demand/output for a recuperative heat exchanger with and without an anode exhaust burner.

FIG. 9 is a graph with power on the vertical axis and system load on the horizontal axis showing the gas expander output and the compressor output for the systems 10, 70 and 120. Particularly, graph line 138 shows the electrical compressor motor power required for the system 10. Graph line 140 shows the electrical compressor motor power required for the system 70 including the recuperative heat exchanger 72. Graph line 142 shows the electrical compressor motor power required for the system 120 including the recuperative heat exchanger 72 and the anode burner 122. Graph line 144 shows the adiabatic expander work for the system 10. Graph line 146 shows the adiabatic expander work for the system 70 including the recuperative heat exchanger 72. Graph line 148 shows the adiabatic expander work for the system 120 employing the recuperative heat exchanger 72 and the anode exhaust burner 122.

Figure 10:
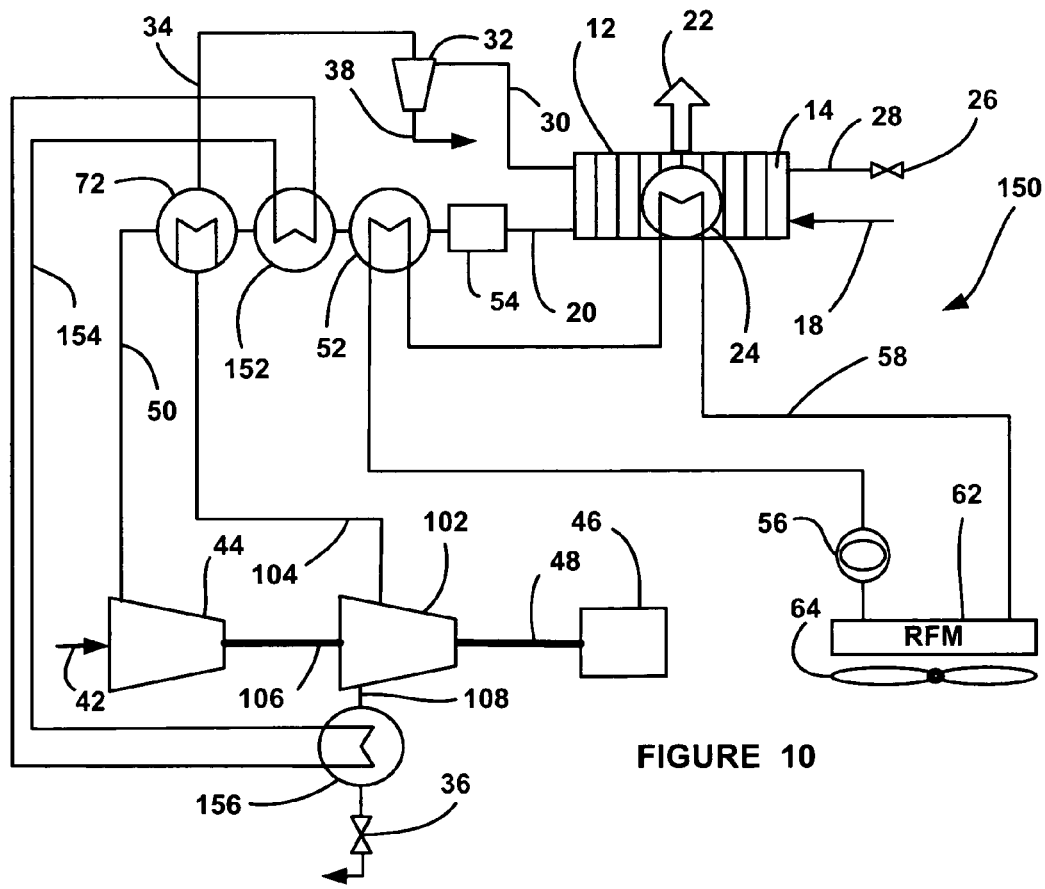
FIG. 10 is a schematic diagram of a fuel cell system employing a cathode gas expander and a recuperative heat exchanger before and after the cathode gas expander.

FIG. 10 is a schematic diagram of a fuel cell system 150 similar to the system 100 above where like elements are represented by the same reference numeral, according to another embodiment of the present invention. In this embodiment, a second recuperative heat exchanger 152 is provided in the line 50 between the recuperative heat exchanger 72 and the heat exchanger 52, as shown. The heat exchanger 152 is coupled to a coolant loop 154 through which flows a cooling fluid, such as a glycol/water mixture. The coolant loop 154 is also coupled to an exhaust heat exchanger 156 in the line 108 at the output of the expander 102. The exhaust gas on the line 108 is cooler than the compressed air on the line 50, so that the cooling fluid in the loop 154 is cooled by the exhaust gas after picking up heat from the compressed air on the line 50. Therefore, the cooling required by the heat exchanger 52 and the RFM 62 can be further reduced by the recuperative heat exchanger 152.

Figure 11:
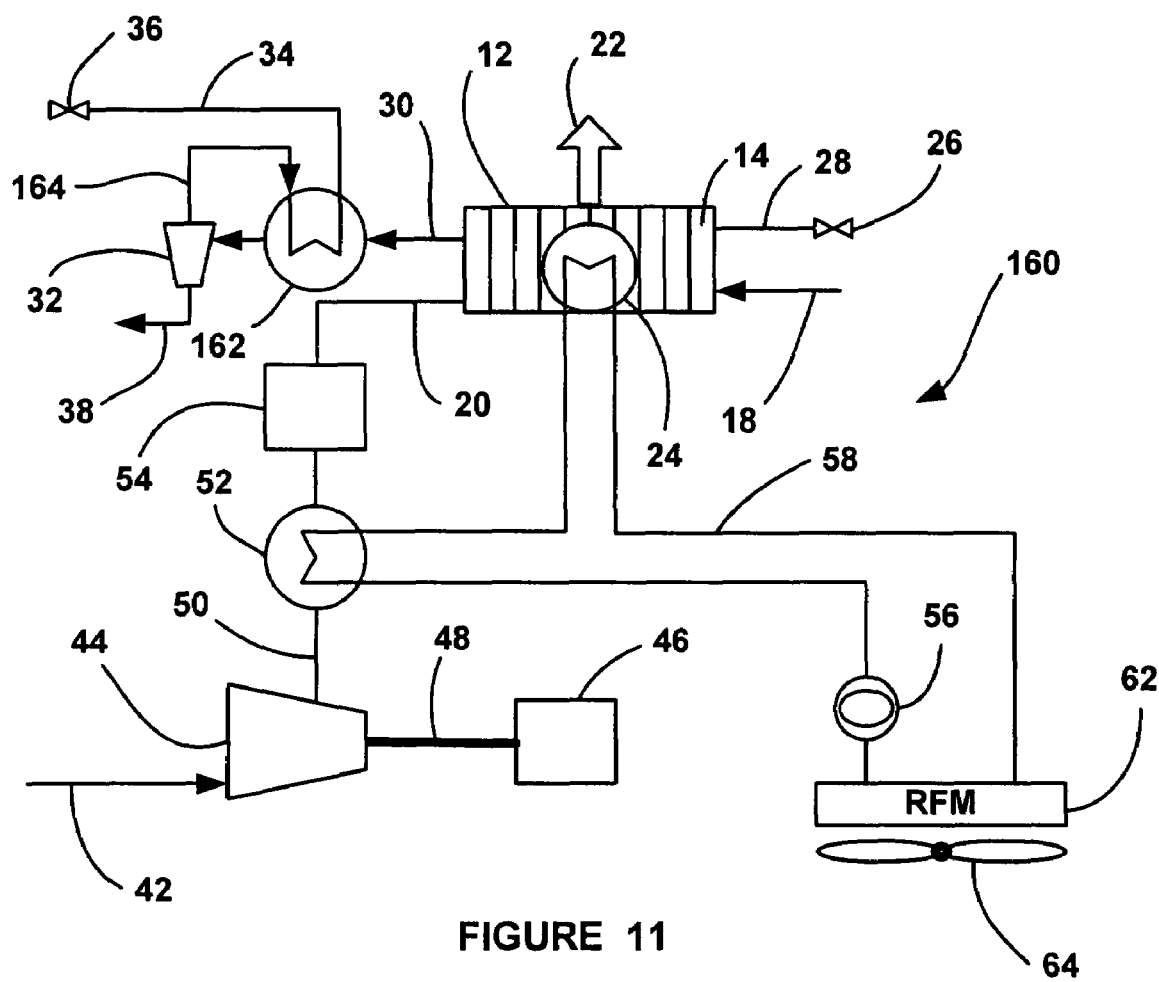
FIG. 11 is a schematic diagram of a fuel cell system employing a recuperative heat exchanger in combination with a water separator, according to another embodiment of the present invention.

FIG. 11 is a schematic diagram of a fuel cell system 160 similar to the system 10 above where like elements are represented by the same reference numeral. In this embodiment, a gas/gas heat exchanger 162 is provided in the cathode exhaust gas line 30. The cathode exhaust gas is cooled by the gas separated from the separator 32, as shown. Particularly, the separated gas from the separator 32 is directed on line 164 through the heat exchanger 162 through which the cathode exhaust gas flows. By using the separated gas from the separator 32 to cool the cathode exhaust gas on the line 30, the separator 32 is better able to remove water vapor from the cathode exhaust gas so that less water is output to the environment and more water is available for other system components.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A fuel cell system comprising:
   a fuel cell stack, said fuel cell stack including a plurality of fuel cells each including an anode and a cathode, said fuel cell stack receiving a hydrogen anode gas and a charge cathode gas and exhausting an anode exhaust gas and a cathode exhaust gas;
   a compressor, said compressor compressing the charge gas to provide the charge cathode gas;

a first coolant loop including a cooling fluid flowing therethrough, said first coolant loop including a first heat exchanger receiving and cooling the compressed charge gas, a second heat exchanger positioned within the fuel cell stack for cooling the fuel cell stack and a third heat exchanger for cooling the cooling fluid that has been heated by the compressed charge gas and the fuel cell stack; and a first recuperative heat exchanger also receiving the compressed charge gas and providing additional cooling for the compressed charge gas.

2. The system according to claim 1 wherein the recuperative heat exchanger also receives the cathode exhaust gas to cool the charge air flowing therethrough.

3. The system according to claim 2 further comprising a cathode exhaust gas expander, said cathode exhaust gas expander being mechanically coupled to the compressor by an expander shaft, said cathode exhaust gas expander receiving the heated cathode exhaust gas from the recuperative heat exchanger so as to cause the expander shaft to rotate to drive the compressor.

4. The system according to claim 3 further comprising an anode exhaust gas combustor, said anode exhaust gas combustor receiving the anode exhaust gas and the cathode exhaust gas, said anode exhaust gas combustor burning residual hydrogen in the anode exhaust gas to further heat the cathode exhaust gas before it is sent to the cathode exhaust gas expander.

5. The system according to claim 3 further comprising a second recuperative heat exchanger and an expander heat exchanger, said second recuperative heat exchanger and said expander heat exchanger being part of a second coolant loop having a cooling fluid flowing therethrough, said second recuperative heat exchanger also receiving and cooling the compressed charge gas before it is applied to the fuel cell stack, said expander heat exchanger receiving the cooling fluid in the second coolant loop flowing through the second recuperative heat exchanger and cooling the cooling fluid.

6. The system according to claim 1 wherein the third heat exchanger is a radiator fan module that cools the cooling fluid in the first coolant loop by forced air.

7. The system according to claim 1 further comprising a humidification unit that receives the compressed charge gas, said humidification unit mixing water vapor with the compressed charge gas before it is sent to the fuel cell stack.

8. The system according to claim 1 further comprising a liquid separator, said liquid separator receiving the cathode exhaust gas and removing water vapor therefrom.

9. The system according to claim 8 further comprising a separator heat exchanger that receives the cathode exhaust gas and separated gas from the liquid separator for cooling the cathode exhaust gas.

10. The system according to claim 1 wherein the fuel cell system is on a vehicle.

11. A fuel cell system comprising:
a fuel cell stack, said fuel cell stack including a plurality of fuel cells each including an anode and a cathode, said fuel cell stack receiving a hydrogen anode gas and a charge cathode gas and exhausting an anode exhaust gas and a cathode exhaust gas;
a compressor, said compressor compressing the charge gas to provide the charge cathode gas;
a cathode exhaust gas expander, said cathode exhaust gas expander being mechanically coupled to the compressor by an expander shaft, said cathode gas exhaust expander receiving the cathode exhaust gas and causing the expander shaft to rotate to drive the compressor; and a recuperative heat exchanger and an expander heat exchanger, said recuperative heat exchanger and said expander heat exchanger being part of a coolant loop having a cooling fluid flowing therethrough, said recuperative heat exchanger receiving and cooling the compressed charge gas before it is applied to the fuel cell stack, said expander heat exchanger receiving the cooling fluid flowing through the recuperative heat exchanger and cooling the cooling fluid.

12. The system according to claim 11 further comprising an anode exhaust gas combustor, said anode exhaust gas combustor receiving the anode exhaust gas and the cathode exhaust gas, said anode exhaust gas combustor burning residual hydrogen in the anode exhaust gas to heat the cathode exhaust gas before it is sent to the cathode exhaust gas expander.

13. The system according to claim 11 further comprising a liquid separator, said liquid separator receiving the cathode exhaust gas and removing water vapor therefrom.

14. The system according to claim 13 further comprising a heat exchanger that receives the cathode exhaust gas and separated gas from the liquid separator for cooling the cathode exhaust gas.

15. The system according to claim 11 wherein the fuel cell system is on a vehicle.

16. A fuel cell system for a vehicle, said system comprising:
a fuel cell stack, said fuel cell stack including a plurality of fuel cells each including an anode and a cathode, said fuel cell stack receiving a hydrogen anode gas and a charge air cathode gas and exhausting an anode exhaust gas and a cathode exhaust gas;
a compressor, said compressor compressing the charge air to provide the charge air cathode gas;
a first coolant loop including a cooling fluid flowing therethrough, said coolant loop including a first heat exchanger receiving and cooling the compressed charge air, a second heat exchanger positioned within the fuel cell stack for cooling the fuel cell stack and a third heat exchanger for cooling the cooling fluid that has been heated by the compressed charge air and the fuel cell stack;
a first recuperative heat exchanger also receiving the compressed charge air and providing additional cooling for the compressed charge air, said first recuperative heat exchanger receiving the cathode exhaust gas to cool the charge air;
an anode exhaust gas combustor, said anode exhaust gas combustor receiving the anode exhaust gas and the cathode exhaust gas combustor, said anode exhaust combustor burning residual hydrogen in the anode exhaust gas to further heat the cathode exhaust gas; and
a cathode exhaust gas expander, said cathode exhaust gas expander being mechanically coupled to the compressor by an expander shaft, said cathode exhaust gas expander receiving the heated cathode exhaust gas from the anode exhaust gas combustor so as to cause the expander shaft to rotate to drive the compressor.

17. The system according to claim 16 further comprising a second recuperative heat exchanger and an expander heat exchanger, said second recuperative heat exchanger and said expander heat exchanger being part of a second coolant loop having a cooling fluid flowing therethrough, said second recuperative heat exchanger also receiving and cooling the compressed charge gas before it is applied to the fuel cell stack, said expander heat exchanger receiving the cooling fluid in the second coolant loop flowing through the second recuperative heat exchanger and cooling the cooling fluid.

18. The system according to claim 16 wherein the third heat exchanger is a radiator fan module that cools the cooling fluid in the first coolant loop by forced air.

19. The system according to claim 16 further comprising a humidification unit that receives the compressed charge air, said humidification unit mixing water vapor with the compressed charge air before it is sent to the fuel stack.

20. The system according to claim 16 further comprising a liquid separator, said liquid separator receiving the cathode exhaust gas and removing water vapor therefrom.

21. The system according to claim 20 further comprising a separator heat exchanger that receives the cathode exhaust gas and separated gas from the liquid separator for cooling the cathode exhaust gas.

22. A fuel cell system comprising:
- a fuel cell stack, said fuel cell stack including a plurality of fuel cells each including an anode and a cathode, said fuel cell stack receiving a hydrogen anode gas and a charge cathode gas and exhausting an anode exhaust gas and a cathode exhaust gas;
- a liquid separator, said liquid separator receiving the cathode exhaust gas and removing water vapor therefrom; and
- a heat exchanger, said heat exchanger receiving the cathode exhaust gas and separated gas from the liquid separator for the cooling the cathode exhaust gas, said heat exchanger receiving the cathode exhaust gas before the liquid separator receives the cathode exhaust gas.

23. The system according to claim 22 wherein the fuel cell system is on a vehicle.

* * * * *